United States Patent [19]

Endo et al.

[11] 4,344,795
[45] Aug. 17, 1982

[54] IRON-BASED SINTERED SLIDING PRODUCT

[75] Inventors: Hiroyuki Endo, Abiko; Yutaka Ikenoue, Matsudo, both of Japan

[73] Assignee: Hitachi Powdered Metals Company, Ltd., Matsudo, Japan

[21] Appl. No.: 123,088

[22] Filed: Feb. 20, 1980

[30] Foreign Application Priority Data

Nov. 15, 1979 [JP] Japan .................. 54-147020

[51] Int. Cl.$^3$ ............................. B22F 3/00; B22F 5/00
[52] U.S. Cl. ........................................ 75/230; 75/231; 75/243; 188/251 A; 188/251 M
[58] Field of Search ................... 75/231, 230, 243; 188/251 A, 251 M; 103/36

[56] References Cited

U.S. PATENT DOCUMENTS

| | | | |
|---|---|---|---|
| 2,213,523 | 9/1940 | Jones et al. ............................. | 75/230 |
| 2,226,520 | 12/1940 | Lenel ..................................... | 75/230 |
| 2,370,396 | 2/1945 | Cordiano .............................. | 75/243 |
| 3,120,698 | 2/1964 | Elliott ................................... | 75/243 |
| 3,863,318 | 2/1975 | Niimi et al. ........................... | 75/243 |
| 4,230,491 | 10/1980 | Behnke ................................. | 75/243 |
| 4,233,073 | 11/1980 | Takemura ............................. | 75/243 |

Primary Examiner—Brooks H. Hunt
Attorney, Agent, or Firm—Craig and Antonelli

[57] ABSTRACT

An iron-based sintered sliding product having improved contact fitness and resistance to wear, in which 0.1 to 3 wt. % free graphite and Fe—P—C ternary alloy phase of hardness MHv 300 to 850 having over 3% to 20% of area are dispersed into an iron-based matrix containing either one selected from 0.1 to 1 wt. % Sn and 0.1 to 1 wt. % Zn, and 1 to 10 wt. % Cu and 0.3 to 1 wt. % C. As a modified embodiment of the present invention, an alloy containing Fe—Mo as a main component may be dispersed into the iron-based matrix in place of the aforesaid Fe—P—C ternary alloy phase. Said Fe—P—C ternary alloy phase may be prepared by mixing a single metal element, Fe, C and P into the powdered raw material of the iron-based matrix. Alternatively, said Fe—P—C ternary alloy phase may be prepared by mixing Fe—P—C alloy powder into the powdered raw material of the iron-based matrix. Further, an alloy containing Fe—Mo as a main component may be prepared by mixing Fe—Mo—Si alloy powder into the powdered raw material of the iron-based matrix.

11 Claims, 1 Drawing Figure

IRON-BASED SINTERED SLIDING PRODUCT

BACKGROUND OF THE INVENTION

1. Field of the Invention

The present invention relates to a sintered alloy having improved contact fitness and resistance to wear, and particularly relates to an iron-based sintered sliding product having Sn or Zn, Cu and C as effective components, each of which is dispersed into the iron-based matrix.

2. Description of the Prior Art

Hitherto, frictional sliding members having high resistance to wear have been developed and put into practical use for a variety of applications, they are manufactured in such a manner that a large quantity of graphite as a solid lubricant is added to ensure resistance to wear so that after completion of sintering, a part of said graphite remains in the iron-based matrix in the form of free graphite which has excellent lubricating ability. However, there are drawbacks with conventional iron-based sintered sliding members in that a consistant quality of sintered product is difficult to maintain by conventional manufacturing steps as described above because of fluctuating sintering conditions or the like. Moreover, grains are weakly connected to each other in the iron-based matrix because of the fact that sintering is performed at a temperature lower than that of other sintered products for general industrial use so as to generate free graphite, resulting in prominent wear under operating conditions of higher surface pressure.

SUMMARY OF THE INVENTION

The present invention is intended to eliminate the aforesaid drawbacks in conventional iron-based sintered sliding members to ensure increased contact fitness and resistance to wear of the iron-based sintered sliding members owing to cooperation between free graphite and hardened material dispersed in the iron-based matrix.

Proposed in accordance with the first embodiment of the present invention is an iron-based sintered sliding product in which 0.1 wt. % to 3 wt. % free graphite and Fe - P - C ternary alloy phase having a hardness of MHv 300 to 850 having an area ratio of 3% to 20% are dispersed in an iron-based matrix containing, either from 0.1 wt. % to 1 wt. % Sn or 0.1 wt. % to 1 wt. % Zn, and 1 wt. % to 10 wt. % Cu and 0.3 wt. % to 1 wt. % C. Further, there is proposed in accordance with the second embodiment of the present invention an iron-based sliding product in which the main components, 0.1 wt. % to 3 wt. % free graphite and an alloy containing Fe - Mo having a hardness to MHv 300 to 850, and an area ratio of 3% to 20% are dispersed into the iron-based matrix.

The functions of metallic materials which serve as essential components in the iron-based matrix are described below.

First, 0.1 wt. % to 1 wt. % Sn or 0.1 wt. % to 1 wt. % Zn contained in the iron-based matrix serves to produce the liquid phase under lower sintering temperature which is required to maintain added graphite in a form of free graphite in the subsequent manufacturing step so that the sintering process is facilitated. It is to be noted that said Sn or Zn is also effective in improving the strength of the iron-based matrix in cooperation with 1wt. % to 10 wt. % Cu which is added at the same time. In order to enhance the dispersion of said Sn or Zn and Cu into the iron-based matrix, it is preferable to use Cu - Sn alloy powder or Cu - Zn alloy powder, but a single metal element in powder form, such as Sn powder or Zn powder and Cu powder, may be employed.

As to the amount to be added, it has been found that of Sn or Zn less than 0.1 wt. % fails to bring about the aforesaid, favorable effects, while more than 1 wt. % has the drawback of making the iron-based matrix brittle. Thus the preferred quantity of the aforesaid elements is in the range of 0.1 wt. % to 1 wt. % for the sintered sliding material in accordance with the present invention.

As mentioned above, 0.1 wt. % to 3 wt. % free graphite is additionally dispersed in the iron-based matrix of the sintered sliding member of the invention. It is recognized that less than 0.1 wt. % free graphite will fail to ensure adequate lubrication, but more than 3 wt. % will reduce the strength of the iron-based matrix.

Next, as for Fe - P - C ternary alloy phase which has a hardness of MHv 300 to 850 and is dispersed in the iron-based matrix at an area ratio of 3% to 20%, it is pointed out that a hardness of this material lower than MHv 300 won't contribute to resistance to wear, while a hardness higher than MHv 850 tends to injure mating parts or members of the sintered sliding member. Moreover, with the aforesaid hardened material, an area ratio of less than 3% fails to result in improved resistance to wear owing to a dispersion effect, while an area ratio over 20% makes the sliding member brittle since wear resistance then exceeds the critical range. Thus, the range of the area ratio for the sintered sliding product of the invention is defined.

There are two methods of dispersing said ternary hardened material into the iron-based matrix, one of them being a method of causing the ternary hardened material to be precipitated in the iron-based matrix during sintering, the other being a method of adding the ternary hardened material in an alloy powder form to the powdered raw material of the iron-based matrix during the mixing operation. It is to be noted that the sintering temperature should be below the melting temperature of the allow powder in both of the aforesaid two methods. In the first method it is possible to precipitate Fe - P - C ternary alloy phase in the course of sintering by adding a single metal element of Fe, C and P in a powder form when preparing the powdered raw material for the iron-based matrix. On the other hand, the second method of using Fe - P - C alloy powder makes it possible to disperse Fe - P - C ternary alloy phase in the iron-based matrix by preparing the aforesaid Fe - P - C alloy powder via casting and disintegrating steps and adding it to the powdered raw material of the iron-based matrix. As far as the bonding strength of the iron-based matrix is concerned, hardened material of the type which is precipitated during the sintering operation is preferable. If prealloyed powder is used, it is necessary to avoid oxidation during the sintering operation which connecting strength might reduce the bonding strength between the prealloyed powder and the iron-based matrix.

To disperse an alloy containing Fe - Mo as a main component into the iron-based matrix in accordance with the second embodiment of the present invention, an alloy powder containing Fe - Mo as a main component is used in the same manner as in case of dispersing Fe - P - C ternary alloy phase. Usually Fe - Mo prealloy powder is manufactured by an atomizing method and added to the powdered raw material for the iron-based matrix.

Therefore, it is an object of the present invention to provide an iron-based sintered sliding product having substantially improved contact fitness and resistance to wear owing to the inclusion of two kinds of effective components into the iron-based matrix.

It is another object of the present invention to provide an iron-based sintered sliding product having substantially improved properties owing to employment of additives which are readily available at inexpensive cost.

It is another object of the present invention to provide an iron-based sintered sliding product which is easy to manufacture.

Other objects and advantageous features of the present invention will be apparent from the following description with reference to the accompanying drawing.

BRIEF DESCRIPTION OF THE ACCOMPANYING DRAWING

A single drawing schematically illustrates a pin-disc type frictional wear testing apparatus which is designed and constructed for the purpose of comparing an iron-based sliding product according to the invention and a reference piece.

DETAILED DESCRIPTION OF THE PREFERRED EMBODIMENTS OF THE INVENTION

Figure 1:
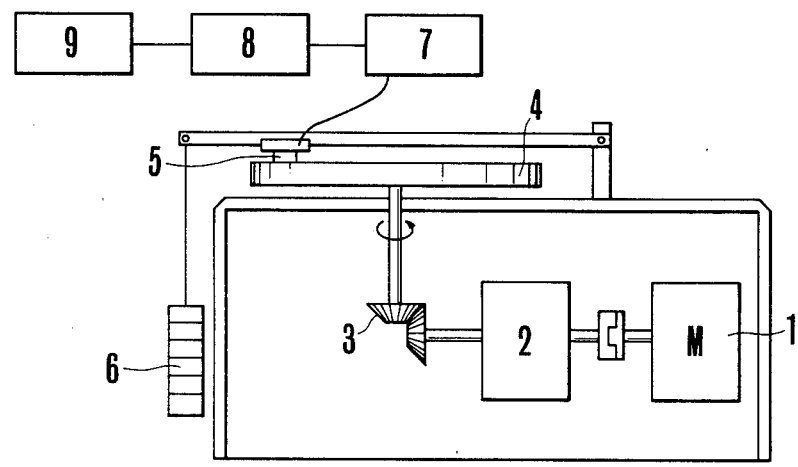

Now the present invention will be described in more detail with reference to four embodiments of the invention with the aid of a single accompanying drawing.

EXAMPLE 1

This example is concerned with a sintered alloy product of iron-based matrix having free graphite and precipitation type Fe - P - C ternary alloy phase dispersed therein, said iron-based matrix containing C, Sn and Cu.

Molding and sintering were performed in a series of processing steps; preparing mixed powder containing 2.5 wt. % natural graphite, 5 wt. % of 90 wt. % Cu - 10 wt. % Sn alloy powder, 1 wt. % of 85 wt. % Fe - 15 wt. % P alloy powder, 0.5 wt. % zinc stearate and the remainder being atomized iron powder; compressing the mixed powder at a pressure of 5 t/cm$^2$; and then subjecting the molded product to sintering at a temperature of 1,000° C. a non-oxidizing gas atmosphere for 30 minutes. It was found that the sintered product had 1.2 wt. % free graphite and the precipitated Fe - P - C ternary alloy phase had a hardness of MHv 400 to 700 and a surface area ratio of 10%.

To measure the resistance of said sintered product to the frictional coefficient ($\mu$) and the specific wearing rate (mm$^3$/Kg.Km) were measured with the aid of a pin-disc type frictional wear testing apparatus as illustrated in FIG. 1.

In FIG. 1, the reference numeral 1 denotes a motor, of which the driving force is transferred to a disc 4 for rotating it via a combination of transmission gear 2 and bevel gears 3. On said disc 4 is located a specimen 5 to which a predetermined load is imparted by means of a weight 6 so that the specimen 5 is subjected to wear as the disc 4 is rotated. Further, the reference numeral 7 denotes a strain gauge and the measured strain value 8 is recorded in a X - T recorder. With the aid of the above described testing apparatus, testing was performed without any lubricant, Cr - Mo alloy steel (SCM 21 according to JIS) was employed for the disc 4, the given load T was preset at 10 Kg/cm$^2$, and the rotational speed was preset at 200 m/min.

From the results of the frictional wear tests, it was found that the sintered specimen in Example 1 had a frictional coefficient ($\mu$) of 0.34 and a specific wearing rate of 0.5. Further, to compare a plurality of specimens including the specimen prepared in Example 1, the following three specimens were prepared and subjected to wear under the same conditions.

comparative specimen A—specimen of iron-based matrix having only free graphite dispersed therein, said iron-based matrix being prepared under the same conditions as in Example 1 comparative specimen B—specimen of iron-based matrix having only hardened material dispersed therein, said iron-based matrix being the same as the preceding specimen A comparative specimen C—specimen is the same iron-based matrix as in the above specimens A and B The results of frictional wear tests performed on the above three specimens A, B and C under the aforesaid testing conditions are shown in Table 1.

TABLE 1

| specimen | frictional coefficient ($\mu$) | specific wearing rate (mm$^3$/Kg.Km) |
| --- | --- | --- |
| comparative specimen A | 0.33 | 2.5 |
| comparative specimen B | 0.68 | 0.8 |
| comparative specimen C | 0.65 | 3.2 |

As is apparent from comparisons between the specimen in Example 1 and the above three comparative specimens, the former has a remarkably improved frictional coefficient and specific wearing rate owing to the coexistence of free graphite and ternary hardened material.

EXAMPLE 2

This example is concerned with a sintered alloy product of iron-based matrix having free graphite and precipitation type Fe - P - C ternary alloy phase dispersed therein, wherein said iron-based matrix contains C, Zn and Cu.

Molding and sintering were performed in a series of processing steps; of preparing mixed powder containing 2.5 wt. % natural graphite, 5 wt. % of 80 wt. % Cu - 20 wt. % Zn alloy powder, 1 wt. % of 85 wt. % Fe - 15 wt. % P alloy powder, 0.5 % zinc stearate and the remainder being atomized iron powder; compressing the mixed powder at a pressure of 5t/cm$^2$; and then subjecting the molded product to sintering at a temperature of 1,000° C. in a non-oxidizing gas atmosphere for 30 minutes. It was found that the sintered product had 1.2 wt. % free graphite and the precipitated Fe - P - C ternary alloy phase involved in said sintered product had a hardness of MHv 400 to 700 and a surface area ratio of 10%. Tests performed under the same conditions as in Example 1 showed a frictional coefficient ($\mu$) of 0.31 and a specific wearing rate of 0.5 for the product.

EXAMPLE 3

This example is concerned with a sintered product of iron-based matrix having free graphite and Fe - P - C ternary alloy powder dispersed therein, wherein said iron-based matrix contains C, Sn and Cu.

Molding and sintering were performed in a series of processing steps; preparing mixed powder containing 2.5 wt. % natural graphite, 5 wt. % of 90 wt. % Cu - 10 wt. % Sn alloy powder, 10 wt. % of 93 wt. % Fe - 2 wt. % C-5 wt. % P alloy powder, 0.5 wt. % zinc stearate, with the remainder being atomized iron powder; compressing the mixed powder at a pressure of 5 t/cm$^2$; and then subjecting the molded product to sintering at a temperature of 980° C. in a non-oxidizing gas atmosphere for 30 minutes. It was found that the sintered product so manufactured had 1.5 wt. % free graphite and the Fe - P - C ternary alloy phase involved in said sintered product had a hardness of MHv 500 to 650 and a surface area of about 8%. Tests performed under the same conditions as in Examples 1 and 2 showed a frictional coefficient ($\mu$) of 0.27 and a specific wearing rate of 0.29.

EXAMPLE 4

This example is concerned with a sintered product of iron-based matrix having free graphite and Fe - Mo - Si alloy phase dispersed therein, wherein said iron-based matrix contains C, Sn and Cu.

Molding and sintering were performed in a series of processing steps; preparing mixed powder containing 2.5 wt. % natural graphite, 5 wt. % of 90 wt. % Cu - 10 wt. % Sn alloy powder, 10 wt. % of 55 wt. % Fe - 35 wt. % Mo - 10 wt. % Si alloy powder, 0.5 wt. % zinc stearate, with the remainder being atomized iron powder; compressing the mixed powder at a pressure of 5 t/cm$^2$; and then subjecting the molded product to sintering at a temperature of 1,000° C. for 30 minutes in a non-oxidizing gas atmosphere. It was found that the sintered product so manufactured had 1.5 wt. % free graphite and the Fe - Mo - Si alloy had a hardness of MHv 600 to 700 and a surface area ratio of about 6 %. Tests performed under the same conditions as in Examples 1, 2 and 3, showed a frictional coefficient ($\mu$) of 0.29 and a specific wearing rate of 0.29.

The results of the tests described in Examples 1 through 4 are summarized in the following Table (2).

TABLE 2

| specimen | frictional coefficient ($\mu$) | specific wearing rate (mm$^3$/Kg.Km) |
| --- | --- | --- |
| Example 1 | 0.34 | 0.5 |
| Example 2 | 0.31 | 0.5 |
| Example 3 | 0.29 | 0.6 |
| Example 4 | 0.29 | 0.5 |

As is apparent from Tables 1 and 2 above in which the results of Example 1 through 4 for the comparative specimens A, B and C are summarized, it is readily understood that sintered sliding members in accordance with the present invention have excellent frictional coefficients and specific wearing rates.

As mentioned above, the chemical compositions, sintering conditions and characteristic properties of sintered sliding members in accordance with the invention have been described with reference to four examples in the above manner so that it becomes obvious that the present invention provides sintered frictional sliding members which have improved frictional contact fitness and resistance to wear owing to the simultaneous functioning of lubrication by free graphite and reinforcement by means of hardened material or alloy dispersed in the iron-based matrix. Further, it is to be noted that, owing to the uniform material structure and strengthened metallurgical conjunction between the respective grains of the sintered sliding products of the invention, there products have a potentially wider area of application than conventional sliding members.

Finally, it should be understood that the present invention is not limited to the above-described preferred embodiments, and it may be modified or changed in a suitable manner without any departure from the spirit and scope of the invention.

We claim:

1. An iron-based sintered sliding product, wherein 0.1 weight % to 3 weight % free graphite and Fe - P - C ternary alloy phase having a hardness of MHv 300 to 850 and having an area ratio of 3% to 20% are dispersed in an iron-based matrix containing either from 0.1 weight % to 1 weight % Sn or 0.1 weight % to 1 weight % Zn, and 1 weight % to 10 weight % Cu and 0.3 weight % to 1 weight % C.

2. An iron-base sintered sliding product as set forth in claim 1, wherein said iron-based matrix of the sintered sliding product contains Cu - Sn alloy powder or Cu - Zn alloy powder dispersed therein as dispersion material.

3. An iron-based sintered sliding product as set forth in claim 1, wherein said iron-based matrix of the sintered sliding product contains a single metal element, Sn or Zn and Cu, in powder form dispersed therein as dispersion material.

4. An iron-base sintered sliding product as set forth in claims 1 through 3, wherein the free graphite to be dispersed in said iron-based matrix is prepared by mixing natural graphite with the powdered raw material.

5. An iron-based sintered sliding product as set forth in claim 1, wherein the Fe - P - C ternary hardened material to be dispersed in said iron-based matrix is prepared by separately mixing a single metal element, Fe, C and P in powder form, with the powdered raw material.

6. An iron-based sintered sliding product as set forth in claim 1, wherein the Fe - P - C ternary alloy phase to be dispersed in said iron-based matrix is prepared by mixing an Fe - C - P alloy in powder form with the powdered raw material.

7. An iron-based sintered sliding product wherein a Fe - Mo alloy phase having a hardness of MHv 300 to 850 and having an area ratio of 3% to 20% and 0.1 weight % to 3 weight % free graphite are dispersed as main components into an iron-based matrix containing either from 0.1 weight % to 1 weight % Sn or 0.1 weight % to 1 weight % Zn, and 1 weight % to 10 weight % Cu and 0.3 weight % to 1 weight % C.

8. An iron-based sintered sliding product as set forth in claim 7, wherein said iron-based matrix of the sintered sliding product contains Cu - Sn alloy powder or Cu - Zn alloy powder dispersed therein as a dispersion material.

9. An iron-based sintered sliding product as set forth in claim 7, wherein said iron-based matrix of the sintered sliding product contains a single metal element, Sn or Zn and Cu in powder, form dispersed therein as a dispersion material.

10. An iron-based sintered sliding product as set forth in claims 7 through 9, wherein free graphite to be dispersed in said iron-based matrix is prepared by mixing natural graphite with the powdered raw material.

11. An iron-based sintered sliding product as set forth in claim 7, wherein an alloy containing Fe - Mo alloy as a main component to be dispersed in said iron-based matrix is prepared by mixing Fe - Mo - Si alloy in powder form with the powdered raw material.

* * * * *